(No Model.) 2 Sheets—Sheet 2.
N. P. PRATT.
PROCESS OF AND APPARATUS FOR MAKING SULFURIC ACID.
No. 546,596. Patented Sept. 17, 1895.
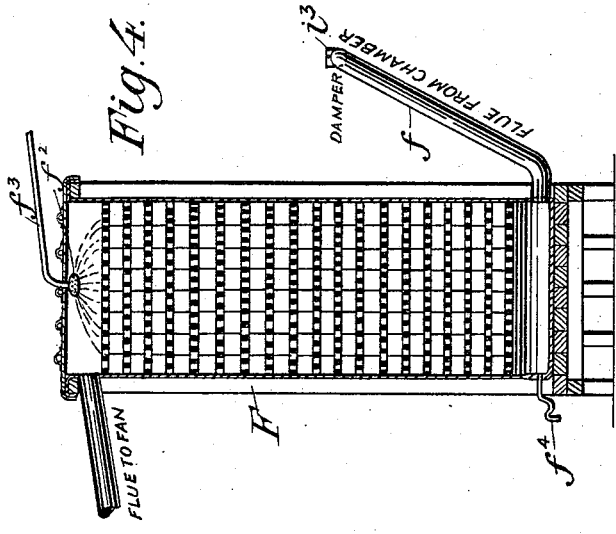
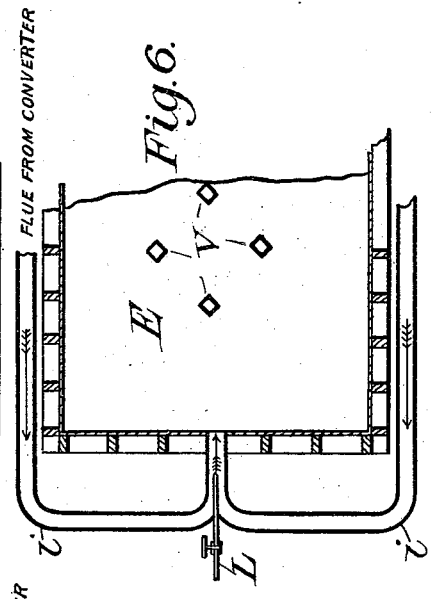
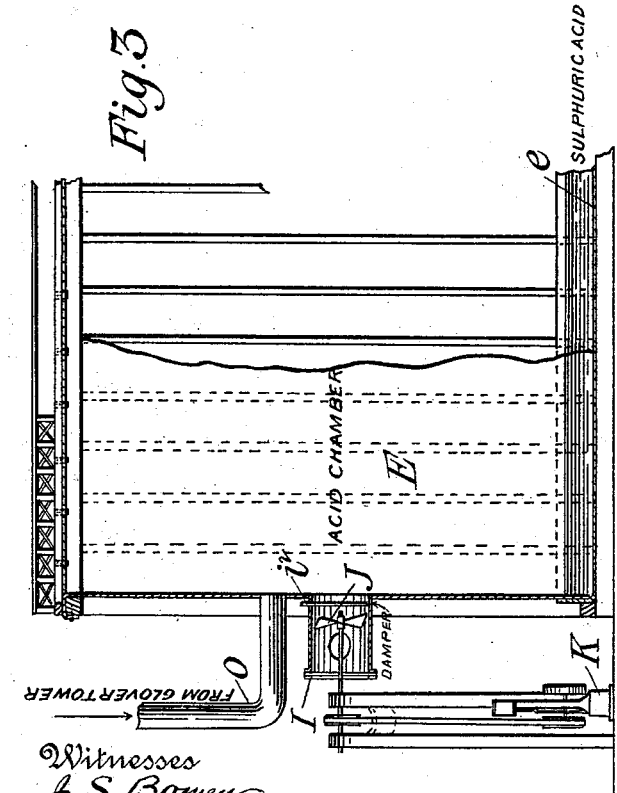
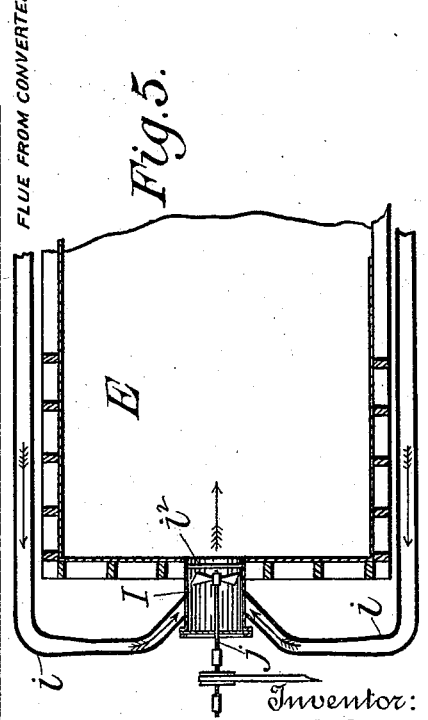
Witnesses
J. S. Bowen.
Inventor:
N. P. Pratt,
by
his Attorney

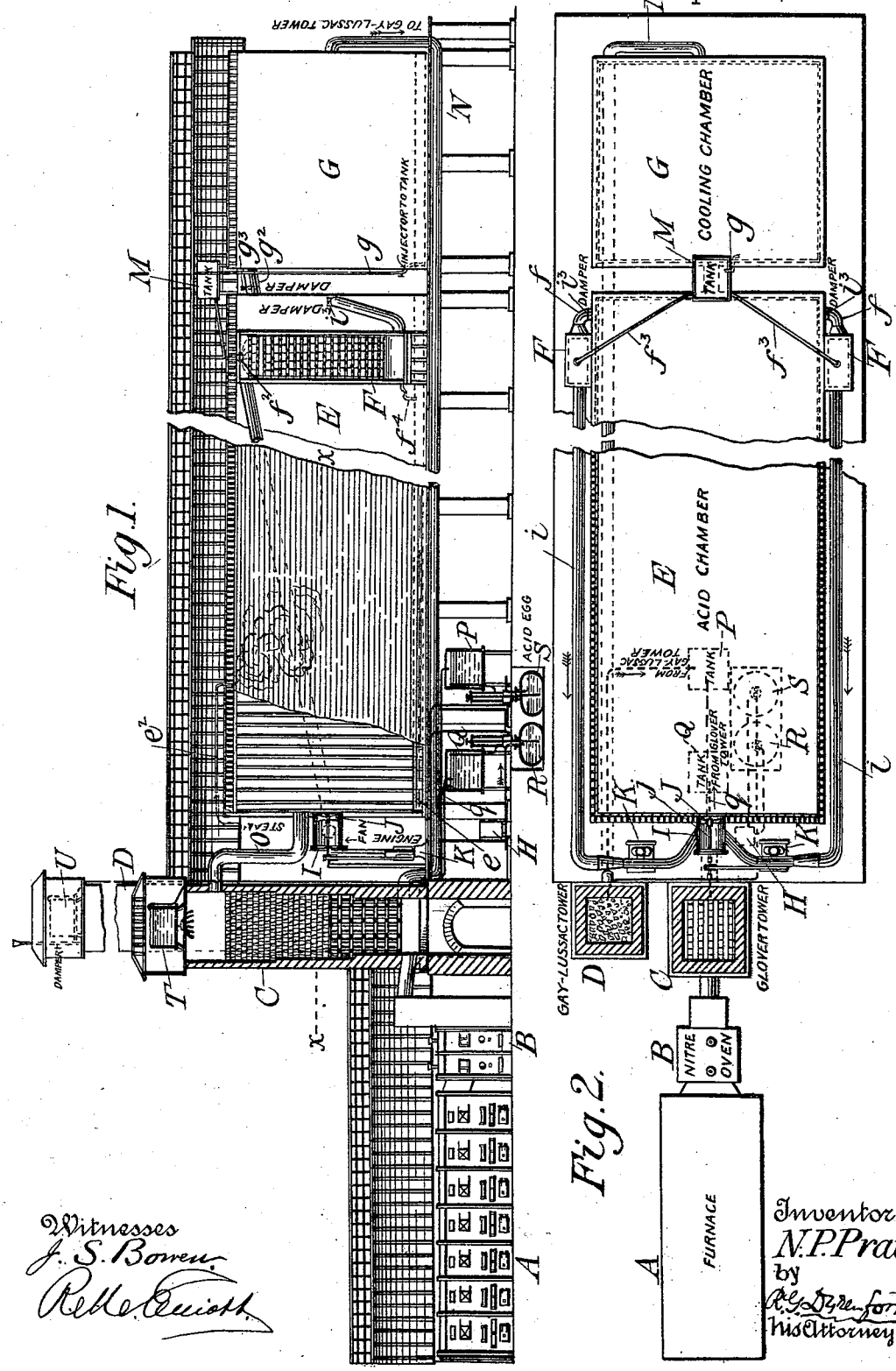

UNITED STATES PATENT OFFICE.

NATHANIEL P. PRATT, OF ATLANTA, GEORGIA.

PROCESS OF AND APPARATUS FOR MAKING SULFURIC ACID.

SPECIFICATION forming part of Letters Patent No. 546,596, dated September 17, 1895.

Application filed January 19, 1895. Serial No. 535,543. (No model.)

*To all whom it may concern:*

Be it known that I, NATHANIEL P. PRATT, a citizen of the United States, residing at Atlanta, in the county of Fulton and State of Georgia, have invented certain new and useful Improvements in the Manufacture of Sulfuric Acid; and I do hereby declare the following to be a full, clear, and exact description of the invention, such as will enable others skilled in the art to which it appertains to make and use the same.

This invention relates to the manufacture of sulfuric acid.

In the manufacture of sulfuric acid a controlling feature in its economy is the cubic space requisite for the practical conversion of the sulfur dioxid from a unit of sulfur from any source into sulfuric acid, the cubic space usually calculated being understood to be the total cubical capacity of the chambers.

In all ordinary sulfuric acid apparatus there is a great difference in temperature between the front and rear ends of the chamber or chambers, especially if the first chamber be a long one. This is due to the quickened reaction between the well-mixed gases, liquids, and vapors immediately on entering the chamber from their generators direct or through the Glover tower and their want of intimate mixture on leaving the chamber at the opposite end.

All chemical reaction is quickened by brisk and thorough mixing of the gases or liquids, or both, which possess any degree of chemical affinity. Chemical action between the chamber compounds generates heat in the ratio of activity between them, and this heat itself in reflex action aids in quickening such activity. Therefore intimate admixture of the acid-producing materials and their projection onward throughout the whole extent of the acid-producing portion of a plant greatly intensifies the result.

According to established physical laws the projection of one current into another which is confined to a given conduit, at any angle in the direction of its general motion, tends to accelerate that motion; or, if two closely-lying flues, with mouths ending in the same plane and at right angles to the line of discharge, be delivering gases, &c., in the same direction, a high velocity given through either will exert suction on tending to increase delivery from the other.

My invention contemplates the introduction of mechanical means for inducing and maintaining a rapid and constant mixing of the acid-making materials, in connection with which mixing I prefer to employ a continuous circulation throughout the entire acid-producing space, this constant mixing as well as the continuous circulation being effected by mechanical power induced by fans, agitators, blowers, steam-jets, steam-injectors, or other like mechanical appliances, thoroughly mixing the acid-producing materials and passing them onward toward the rear of the apparatus, and by circulation withdrawing a portion of the gases, &c., from any point toward the rear, but before they reach the Gay-Lussac tower, and reintroducing the materials not retained into the front of the apparatus at a point and in such manner as to be presented to the draft and mixed directly with the freshly-entered or entering gases, &c., and at the same time accelerate their delivery into the chamber.

I wish here to point a distinction between the employment of a forced motion for the purpose of and having the effect of thorough and rapid accession and progressive admixture of the acid-producing materials throughout the apparatus, and the employment of a mere steam-pipe for the admission of steam in regulated quantities for supplying the necessary water, or the employment of a steam-jet or injector at the bottom or top of the acid-chamber for mixing at a particular zone, but which retards progressive admixture and the draft. The continuous circulation in my procedure is additional and adjunctive to the regular through-draft.

The object of the invention, therefore, is to accelerate the chemical action in, and thus increase the effective working capacity of, a given acid-producing space by projection with resulting agitation and mixture of the gases therein throughout the whole extent of this space.

The object is, furthermore, to effect a more thorough utilization of the nitrous anhydrid as an oxygen-carrier upon the sulfurous-acid gases while passing through the chamber, or chamber-system, previous to its introduction into the Gay-Lussac tower.

The object is, furthermore, to precipitate a great portion of the sulfuric acid existing as suspended misty particles in the chamber-atmosphere, which has escaped previous precipitation, and reintroduce the portion unprecipitated.

The object is, furthermore, to break up substantially all the nitro-sulfuric acid, also existing as suspended misty particles in the chamber-atmosphere, and which has escaped previous decomposition into nitrous anhydrid and sulfuric acid, thus making fresh portions of nitrous anhydrid available to return for further reaction, thus greatly increasing the action of nitrous anhydrid in a given time, the portion escaping to the Gay-Lussac tower being replaced by fresh additions through the Glover tower in the usual way; and, at the same time, retaining practically all the sulfuric acid resulting from the splitting up.

The object is, finally, to convert the larger portion of any sulfurous acid remaining in the chamber-atmosphere, and which has escaped previous conversion, into sulfuric acid, saving the whole of this and reintroducing what is not converted.

With these objects in view the invention consists in saving chamber-space in the manufacture of sulfuric acid, and finally the invention resides in the apparatus and details thereof for carrying the invention into effect.

In the accompanying drawings, forming part of this specification, and in which like letters of reference indicate corresponding parts, I have illustrated one of many ways of carrying my invention into effect, and in these drawings—

Figure 1 is a view in elevation, partly in section, showing the most important elements of an ordinary sulfuric acid plant, together with my improvements. Fig. 2 is a view in horizontal section, taken on the line $x\ x$ of Fig. 1, showing more particularly the connections between the respective parts of the apparatus. Fig. 3 is an enlarged detail view, in vertical section, of the front portion of the acid-chamber, showing more clearly the arrangement of the fan. Fig. 4 is an enlarged detail view of one of the converters, showing more particularly its interior construction and the arrangements of its parts. Fig. 5 is a view, in horizontal section, of the front portion of the acid-chamber, showing more particularly the connection between the flues leading from the converters and the fan; and Fig. 6 is a similar view to Fig. 5, showing, in place of the fan, a steam-injector for agitating and projecting onward the contents of the acid-chamber, and also a number of comminuting columns arranged within the acid-chamber for causing cross-currents therein for additional mixing.

Referring to the drawings, A designates the furnaces; B, the niter-oven arranged, by preference, in rear of and connecting with the furnace; C, the Glover tower; D, the Gay-Lussac tower; E, the acid-chamber; F, the converters; G, the cooling-chamber, and H the compressor. As these parts may be of any of the well-known preferred constructions, a detailed description of them, further than to show their connection and co-operation, is deemed unnecessary.

The acid-chamber E, which may be a single chamber, as shown, or a number of connected chambers, is provided at its front end with a fan-casing I, in which is mounted a fan or blower J, driven by any suitable power, as by engines K, one of which may be a reserve engine to be used in case of an emergency. Electric motors may be used, if preferred, and the power may be either directly coupled to the blower-shaft or connected by belt, as shown.

The fan and its casing are constructed of any suitable acid-resisting material, such as hard lead, and the shaft $j$ of iron or steel, that portion of the shaft within the casing being covered with lead, or the like, to prevent corrosion. In this instance a single fan is shown, but it is to be understood that, if desired, two or more fans may be used or a steam-injector L, as shown in Fig. 6, or any other mechanical appliance capable of causing a progressive mixing or circulation within the acid-chamber may be employed, and that these parts may be connected with any part of the acid-producing portion of the apparatus whereby a thorough mixing throughout the same will be insured.

Connecting with the fan-casing I are two flues or pipes $i$, which lead from the converters F at or near the tops thereof, and connecting with the bottom portion of the converters are flues or pipes $f$, which lead from the sides of the acid-chamber, as best shown in Figs. 1 and 4. The converters are each furnished with a packing composed of any suitable acid-resisting material or materials, which will allow spaces for draft and surfaces for precipitation, conversion, and decomposition. Instead of arranging the converters upright, as shown, they may be arranged horizontally; or in lieu of them, any part of the flues $i$ or $f$ may be packed with acid-resisting materials allowing spaces for draft and surfaces for precipitation.

Arranged in or above the top of each of the converters and at a proper distance above the contained packing is a suitable spraying device $f^2$, such as a rose-nozzle or any preferred form of distributer, which connects, through pipes $f^3$, with a tank M, containing water or dilute sulfuric acid, the latter being supplied from the cooling-chamber G through a pipe $g$, or from any other preferred source. Each of the converters is also provided at its bottom portion with an escape-pipe $f^4$, through which the sulfuric acid escapes from the converters to the chamber-pan $e$. In this instance I have shown but two converters; but it is to be understood that any number may be employed, combined in any suitable order with one or more chambers of a plant, or the converters may be placed alternating with and between any number of chambers in a plant.

The cooling-chamber G is connected with the acid-chamber by means of a flue $g^2$, having by preference a damper $g^3$. This flue may be horizontal or vertical and it may be packed, like the converter, with acid-resisting materials having surfaces for precipitation and spaces for draft. The cooling-chamber is also connected with the Gay-Lussac tower by a flue N, which may also be packed with acid-resisting material, and the acid-chamber is connected with the Glover tower by a flue O, connecting the top of the Glover tower with the acid-chamber at a point above the fan.

Located preferably below the acid-chamber are two tanks P and Q, connecting with acid-eggs R and S, respectively. The tank P receives the nitrous vitriol running from the bottom or pan of the Gay-Lussac tower, whence it is run into acid-egg S, and thence forced by compressed air from the compressor H to a tank T, above the Glover tower, where it is showered down through the contained packing thereof, and after denitration passes out through a pipe $q$ into the tank Q and is drawn into the acid-egg R, whence it is forced by compressed air to the tank U over the Gay-Lussac tower, and so on.

If desired, the acid-chamber may be provided with a number of communicating columns V or other obstructive surfaces for additionally mixing the acid-producing materials with a tendency to convert them into sulfuric acid.

If at any time it should be desired to reduce the acid production without shutting down the entire plant, the process can be discontinued in a few minutes and at any time as quickly started up again. In discontinuing its use the fan or exhauster may be stopped and the blast-flue closed, as by a damper $i^2$. The rear end of flues $f$ could then be closed, as by dampers $i^3$, and the usual apparatus run in the ordinary way.

The operation of the apparatus is as follows: Sulfurous acid, coming from any source, as from the furnace and nitrogen acids from the decomposition of materials producing them, as from the niter-oven, are let into the bottom of the Glover tower, together with the necessary air, as from the draft. The gases rise through the packing in the Glover tower to its top, and thence pass into the acid-chamber where steam is admitted through a pipe $e^2$, supplying the necessary water for hydration. All of the acid-producing materials being now present, chemical action sets in briskly, but gradually decreases in intensity as conversion and precipitation proceed, in their passing with the regular draft, from the front to the rear of the apparatus. From the rear of the main chamber, or the last of the front chambers, the gases pass through a flue into a small or cooling chamber, which also has the effect of precipitating any small quantity of sulfuric acid which may be mechanically carried over into it. As the regular draft carries the gases to the end of the cooling-chamber, there is practically nothing left unprecipitated in normal work but the inert nitrogen contained in the admitted air, the oxygen excess found necessary for proper work, and the nitrogen gases, which have completed their work. These all pass together through a flue leading to the Gay-Lussac tower, and thence upward through its contained packing. In order to preserve the escaping nitrogen acids and save unnecessary renewed generation thereof, strong sulfuric acid, which has the property of absorbing the cool nitrogen acids, is showered down against them in the Gay-Lussac tower, taking them up and passing them to the bottom or pan. The strong sulfuric acid holding the nitrogen acids, and which is known as "nitrous vitriol," passes then from the bottom or pan of the Gay-Lussac tower through a pipe to the tank at its base. From this tank it is run into the acid-egg connected therewith, and from this acid-egg is forced by compressed air to the tank above the Glover tower. From the tank above the Glover tower it is showered through the contained packing of the Glover tower, where it yields its nitrogen acids to the gases from the furnace, and the nitrogen acids, with the furnace-gases, again pass into the acid-chamber. The strong sulfuric acid, relieved of its burden of nitrogen acids, runs from the pan or bottom of the Glover tower through a pipe into a tank at its base, and from this tank it is drawn into the corresponding acid-egg, whence it is forced by compressed air through a pipe into a tank at the top of the Gay-Lussac tower, again to begin its absorbing work in the Gay-Lussac tower, as before. The plant being now in full operation, my process begins. By mechanical means, such as fans, blowers, &c., the gases, &c., are mixed thoroughly and continuously throughout the whole extent of the acid-producing portion of the apparatus, by which name I denominate the apparatus or any part thereof, from and including the furnace or sulfurous acid generator up to and as far as the Gay-Lussac tower, thus enormously augmenting the capacity of a given plant to produce sulfuric acid. At the same time, from near the rear of the acid-producing portion, most of the suspended gases, vapors, and misty particles not precipitated before reaching that point, are drawn through the flues into the bottom of the converters and pass upward through the spaces between the packing thereof. In this passage, by projection against the packing, most of the sulfuric acid entering in a state of suspension from the acid-producing portion is precipitated, also most of any nitro-sulfuric acid entering in a state of suspension from the acid-producing portion, upon meeting water or dilute sulfuric acid showered through the packing from the top of the converters, splits up into sulfuric acid and nitrous anhydrid. The sulfuric acid which is immediately precipitated, joins the other precipitated sulfuric acid and passes through a pipe to the receiving pan or tank. Also, most of any sulfurous acid which has escaped conversion in the acid-producing portion combines with the nitrogen acids and water, forming nitro-sulfuric acid, which immediately splits up into sulfuric acid and nitrous-anhydrid, the resulting sulfuric acid being disposed of in the manner described. Instead of supplying water or weak acid to the converters by showering through the packing from the top, I may, if I please, increase the steam supply to the chamber. This will have the effect of weakening the suspended sulfuric acid mists which are drawn into the converters and which, upon precipitation therein, will yield the weak acid necessary for splitting up the nitro-sulfuric acid. All the residual gases, such as the nitrous anhydrid, the oxygen excess, the inert nitrogen present, and any of the before-mentioned or other compounds which escape retention in the converters, are returned to the front of the apparatus through the flues $i$, and presented to the draft in such manner as to quicken it and thus increase the capacity of a given furnace to produce sulfurous acid, or of a given generator to present sulfurous acid, also to increase the draft capacity of the Glover and Gay-Lussac towers and their flues. It is to be understood that while most of the suspended contents at the farther end of the chamber is drawn into the converters by the fan or exhauster I, and the portions not retained therein carried forward and reintroduced at the front of the chamber by the same agency, the usual steady current of residual gases passes onward into the Gay-Lussac tower, whence those not therein absorbed issue into the atmosphere in the ordinary way. By the manner of presentation set forth, all the gases and compounds reintroduced, as described, are at the same time intimately mixed with the freshly-entering gases from the furnace or generators thereof upon their initial entry into the acid-producing portion. The operations just described are continuous and very rapid, and are additional to and independent of the action of the ordinary draft. This mixing and circulation may be repeated through the acid-making portion of the apparatus and the converters as many times as the fans or blowers have the power to do it, or, in other words, the rapidity and effectiveness of these operations are limited only by the capacity of the fans and auxiliary apparatus. I thus present to the converters, not only the compounds freshly made and unprecipitated, but also those which have passed through them one more times without retention.

It is to be understood that I do not limit myself to the particular place in the apparatus into which the materials not retained by the converters are reintroduced, as these materials may be reintroduced at any suitable part of the apparatus.

It is to be understood that my process may be utilized in other ways than in connection with one large main chamber, as shown in Figs. 1 and 2. The converters may be used with or without the Glover and the Gay-Lussac towers, or either of them, to the entire exclusion of the chambers proper; or with or without the towers, or either of them, and in alternate order with two or more chambers, or combined with them in any other suitable order. In such cases the conduit-flues $i\,f$ may connect any two chambers or any two converters or any chamber with any converter.

Besides mixing the gases in their rapid passage through the chambers under the force of the fan or blower-blasts, it is an important fact that with the fan-flue entering the chamber from six to eighteen inches below the gas-flue from the Glover tower, a moderate though not excessive suction is exerted on this flue, which not only gives the necessary quickened draft through the furnace and Glover tower and forces the residual gases through the Gay-Lussac tower, but it draws immediately and rapidly down into the vortex of the gases from the fan all the gases from the Glover tower, affording their most intimate mixture from the start. If too much draft is thereby exerted on the furnace this is easily overcome by a damper $g^3$ in the flue entering the cooling-chamber, the flue entering the main chamber, the flue entering the Gay-Lussac, or better still, by a damper in the exit-flue above the Gay-Lussac. Thus, in chamber-sets, where natural draft is already deficient, narrow towers can be easily used and greater duty readily exacted from them and from a given furnace or generator of sulfurous acid.

A certain amount of heat is necessary to best work in the chambers, in fact the best work generates high heat; but after passing the Glover tower all gases should enter the chambers comparatively cool in order not to augment unnecessarily the chamber heat. Any excessive heat generated by the intense chemical reactions is reduced as follows: If the chamber-temperature be too high, it is spent in evaporating water from the weak chamber-acid while passing through the converters, as described, this acid being made weaker or stronger as necessity calls for. Besides the above way of greatly cooling the gases which are returned to the front of the apparatus, the long flues leading from the converters to the fan, by radiation, still much further cool them.

Having thus described my invention, what I claim, and desire to secure by Letters Patent, is—

1. In the manufacture of sulfuric acid, the method of accelerating and increasing the production within a given chamber-space, which consists in introducing the materials into the chamber, causing agitation of the same throughout the acid-producing portion of the apparatus, and withdrawing a portion of the matter from one part of the chamber and re-presenting it at another, the operation being without interference with the draft, substantially as described.

2. In the art of making sulfuric acid, the improvement which consists in conducting a portion of gases previous to denitration against a current of dilute sulfuric acid, and subsequently projecting said gases into the chamber by mechanical means, substantially as described.

3. The method of decomposing any nitrosulfuric acid present which has escaped previous decomposition and of precipitating the sulfuric acid freed in the decomposition, by projecting the nitro-sulfuric acid against suitable surfaces under subjection to the action of water or weak sulfuric acid, and returning whatever thereof remains undecomposed and whatever sulfuric acid remains unprecipitated, to the front of the chamber, substantially as described.

4. The method of effecting a thorough commingling of the gases passing to the acid-chamber, which consists in withdrawing a portion of the gases, already generated, from the rear end of the chamber and passing them through a converter, thence leading the gases from the said converter to the front of the acid-chamber, and then mechanically projecting them into the chamber, substantially as described.

5. The method of changing a part of any sulfurous acid present which has escaped previous combination, into nitro-sulfuric acid, of splitting up this compound into sulfuric acid and nitrous anhydrid, of precipitating and saving the resultant sulfuric acid, and conserving the resultant nitrous anhydrid for re-introduction and admixture with the freshly-entered or entering acid-producing materials; which consists in projecting sulfurous acid, nitrous anhydrid and oxygen against obstructive surfaces in the presence of water or weak sulfuric acid and returning the compounds not retained, as well as the materials not converted, toward the front of the apparatus, substantially as described.

6. The method of trapping some of the sulfuric acid which has escaped previous precipitation, by projecting the same against suitable surfaces and returning the materials not precipitated to be intimately mixed with freshly entering acid-producing materials and projecting the mixture against precipitating surfaces, substantially as described.

7. In a sulfuric acid plant, an acid-chamber having an entrance for supplying acid-making materials and an exit-opening, in combination with a blast device, mouthing toward the exit-opening only, for projecting the matter solely toward the exit-opening, and a return for reintroducing a portion thereof at or toward the entrance, substantially as described.

8. In a sulfuric acid plant, an acid-chamber having an entrance for supplying acid-making materials thereto, and an exit-opening, in combination with blast-mechanism and a conduit opening from a portion of the chamber toward its rear end into a portion toward the front thereof, substantially as described.

9. In a sulfuric acid plant, an acid-chamber having a conduit for supplying acid-making materials thereto, a converter connecting with the chamber, and a flue from the converter to the chamber, in combination with blast-mechanism, substantially as described.

10. The combination of an acid-chamber, conduits leading therefrom to towers supplied with packing, and suitable spraying devices, conduits leading from said towers to the front of the chamber, and means for projecting the gases from the front part of the chamber, substantially as described.

11. In a sulfuric acid-chamber, the combination of mechanical means for circulating non-denitrated gases which have once passed through the chamber, and columns located in the path of said gases, substantially as described.

12. The combination with the acid-producing portion of a sulfuric acid plant, of circulation-inducing mechanism, and comminuting and converting columns, substantially as described.

In testimony whereof I affix my signature in presence of two witnesses.

NATHANIEL P. PRATT.

Witnesses:
R. G. DYRENFORTH,
S. G. HOPKINS.